United States Patent [19]

Wesselmann

[11] Patent Number: 4,585,825

[45] Date of Patent: Apr. 29, 1986

[54] MONOVINYLIDENE AROMATIC POLYMER RESINS HAVING ADDED AMOUNTS OF HIGH MOLECULAR WEIGHT POLYMER

[75] Inventor: Mark A. Wesselmann, Chino, Calif.

[73] Assignee: The Dow Chemical Company, Midland, Mich.

[21] Appl. No.: 709,855

[22] Filed: Mar. 8, 1985

Related U.S. Application Data

[63] Continuation-in-part of Ser. No. 537,993, Sep. 30, 1983, abandoned, which is a continuation-in-part of Ser. No. 431,904, Sep. 30, 1982, abandoned.

[51] Int. Cl.$^4$ .................. C08L 25/06; C08L 51/04; C08L 55/02
[52] U.S. Cl. .................. 524/504; 524/515; 524/519; 525/71; 525/76; 525/84; 525/241
[58] Field of Search .................. 525/241, 71, 76, 84; 524/504, 515, 519

[56] References Cited

U.S. PATENT DOCUMENTS

| | | | |
|---|---|---|---|
| 2,454,851 | 11/1948 | Warner | 525/241 |
| 2,864,802 | 12/1959 | Price et al. | 525/241 |
| 4,137,388 | 6/1979 | Cutter | 526/346 |
| 4,187,260 | 2/1980 | Kruse et al. | 525/243 |

OTHER PUBLICATIONS

Japanese Patent Announcement, Rokoi 55-164,207/1980.

Primary Examiner—Jacob Ziegler
Attorney, Agent, or Firm—Jonathan W. Morse; Douglas N. Deline

[57] ABSTRACT

Monovinylidene aromatic polymer compositions which have good combinations of strength, heat resistance and melt flow properties, are produced by, in effect, adding minor amounts of high molecular weight monovinylidene aromatic polymers to major amounts of intermediate molecular weight polymers. These compositions can be advantageously produced by feeding previously polymerized high molecular weight polymer, dissolved in monomer, into a polymerization zone or reactor wherein the intermediate molecular weight polymer is produced in the presence of the high molecular weight polymer.

21 Claims, 4 Drawing Figures

MONOVINYLIDENE AROMATIC POLYMER RESINS HAVING ADDED AMOUNTS OF HIGH MOLECULAR WEIGHT POLYMER

CROSS REFERENCE TO RELATED APPLICATION

This application is a continuation-in-part of copending application Ser. No. 537,993 filed Sept. 30, 1983 now abandoned, which is a continuation-in-part of copending application Ser. No. 431,904, filed Sept. 30, 1982 now abandoned.

BACKGROUND OF THE INVENTION

1. Field of the Invention

This invention relates to general purpose monovinylidene aromatic polymer resins. In one aspect, this invention deals with styrenic polymer resin compositions having improved combinations of heat distortion, tensile strength, and melt flow properties. In another aspect, this invention deals with a process for the preparation of styrenic polymer resins having such improved combinations of properties. This surprising combination of properties is achieved by producing a polymer composition having a particular molecular weight distribution. This invention allows the production of strong heat-resistant molded articles while reducing or eliminating the need for plasticizing additives (typically a mineral oil). The particular molecular weight distribution can readily be achieved by blending a minor portion of a high molecular weight polymer with a major portion of an intermediate molecular weight polymer.

2. Description of the Prior Art

In general, the basic physical properties that are usually desired in the production of molded thermoplastic resin articles are an easily processable starting resin which produces articles that are relatively strong and heat resistant. It is generally known that relatively strong, heat resistant articles can be produced from monovinylidene aromatic polymer resins. It is also well known that most such resins otherwise suitable for producing articles possessing these properties must be modified in some way to improve their melt flow characteristics enough to allow them to be both easily and rapidly processed on available processing equipment, such as injection molding equipment, under normal conditions.

The prior art approaches to improving the processability of styrenic resins have involved (a) adding a plasticizing compound such as mineral oil; (b) lowering the average molecular weight of the resin; or (c) broadening the molecular weight distribution of the resin to increase the size of the lower molecular weight fraction and decrease the number average molecular weight to improve the melt flow rates.

It is well known in the thermoplastic molding art that there are several problems associated with plasticizing additives. Most plasticizers, while improving the melt flow characteristics of a thermoplastic resin, rapidly decrease its Vicat Heat Distortion temperature (VHD). Mineral oil, a very commonly used plasticizer, not only reduces the VHD of a resin, it can also cause die drip, fogging and smoking during processing.

With regard to improving processability by lowering the average molecular weight of the resin, it has been found that while reducing the average molecular weight of monovinylidene aromatic polymer resins can yield desirable melt flow characteristics and processability, there is a noticeable reduction in the strength of the articles made therefrom.

It is also known that broadening the molecular weight distribution of monovinylidene aromatic polymer resins can achieve beneficial results with regard to the processability mainly due to the increase in the amount of lower molecular weight polymer present therein. However, the increased processability achieved by broadening the molecular weight distribution of the resin is usually accompanied by problems associated with die swell occurring during processing as well as loss of strength and lowered heat distortion temperatures of articles formed therefrom. See, for examples of broadening molecular weight distributions, U.S. Pat. No. 4,137,388 to Cutter which teaches increasing the amounts of both the low and high molecular weight fractions in polystyrene resins to improve the melt flow and strength properties of polystyrene. See also, for example, Japanese Patent Announcement Kokai No. 55-164,207/1980 which similarly teaches broadening the molecular weight distribution in both the low and high molecular weight areas to achieve superior heat resistance, impact resistance and molding characteristics. See also U.S. Pat. No. 4,187,260 to Kruse, et al. where it is taught that it is desirable to increase the amount of high molecular weight monoalkenyl aromatic polymer in the matrix phase of a rubber-modified monoalkenyl aromatic polymer to balance the large amounts of low molecular weight polymer produced while grafting large amounts of polymer onto the rubber.

As is shown by the teachings of these patents, it is generally believed that it is necessary to have increased amounts of low molecular weight polymer, sometimes balanced with amounts of high molecular weight polymer, in order to achieve desirable combinations of melt flow and strength properties. The low molecular weight fractions are generally believed responsible for such improved melt flow properties. It is also generally believed that an increase in the amount of high molecular weight polymer, while improving the physical properties of molded articles, will result in decreased processability and necessitate the use of plasticizing additives such as mineral oil or low molecular weight polymer in order to achieve suitable processability.

3. Objects of the Invention

In view of what is known in the art, it would be desirable to have monovinylidene aromatic polymer compositions suitable for use as molding resins, which resins would possess melt flow properties which make them easily processable, reducing or preferably eliminating the need for plasticizing additives, which resins would facilitate the production of strong, heat resistant articles.

It would be very desirable, in view of the detrimental effects of low molecular weight polymer in a monovinylidene aromatic polymer resin, to produce resins possessing such good melt flow properties without substantially increasing the size of the low molecular weight fractions of such resins. It would be most desirable if strong, heat resistant, easily processable resins could be obtained by blending amounts of certain high molecular weight resins with intermediate molecular weight base resins. It would also be desirable if the production of these blends could be done in a continuous polymerization process.

SUMMARY OF THE INVENTION

Pursuant to the present invention strong, heat resistant monovinylidene aromatic polymer resin compositions are produced having improved melt flow properties which make them very suitable for injection molding purposes. The resins comprise (a) a major portion of an intermediate molecular weight monovinylidene aromatic polymer, (b) a minor portion of a high molecular weight monovinylidene aromatic polymer, and (c) less than 0.5 percent by weight based on the combined weights of (a) and (b) of a plasticizer. Both portions of polymer have relatively narrow molecular weight distributions and the resultant resin also has a relatively narrow molecular weight distribution compared to resins having similar melt flow properties. It is in fact surprising and unexpected that the present resins, having good strength and heat resistance, also have such good processability and melt flow properties.

DETAILED DESCRIPTION OF THE INVENTION

Figure 1:
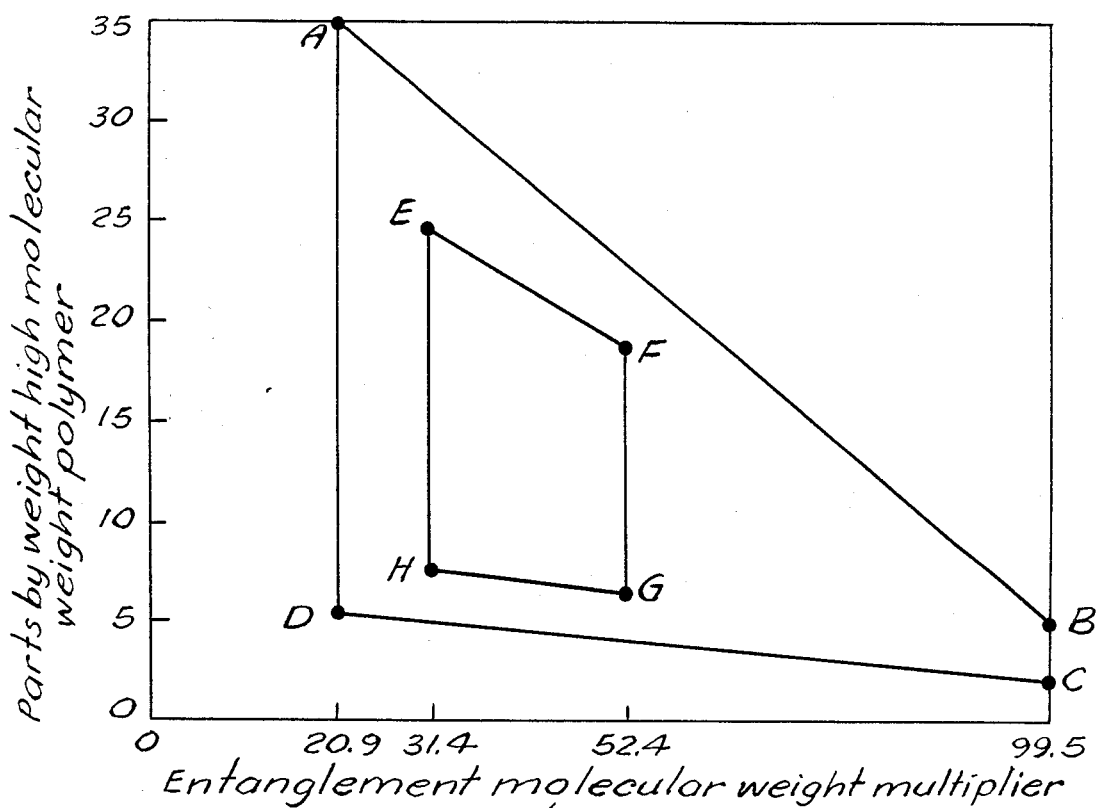
FIG. 1 is a graphical illustration of the relationship between the Entanglement Molecular Weight Multiplier of high molecular weight monovinylidene aromatic polymers and the amount of such polymers suitable for use in achieving the present invention.

The presently claimed composition generally comprises a blend or mixture of two monovinylidene aromatic polymers. It has been found that such compositions possess a desirable combination of properties not achievable in prior art monovinylidene aromatic polymer compositions. One ingredient is an intermediate molecular weight monovinylidene aromatic polymer, and the second is a high molecular weight monovinylidene aromatic polymer.

As used herein, monovinylidene aromatic polymer means a polymer comprising at least a major portion of an addition polymerized monomer of the formula:

wherein $R_1$ is selected from the group of radicals consisting of hydrogen and alkyl radicals containing three carbons or less and Ar is selected from the group of radicals consisting of phenyl, halophenyl, alkylphenyl and alkylhalophenyl. Preferably, $R_1$ is a hydrogen or methyl radical. Preferably, Ar is phenyl or alkylphenyl. Preferably, the polymer is polystyrene.

The presently claimed invention is also applicable to the rigid, matrix or continuous phase polymer of rubber-modified monovinylidene aromatic polymer compositions.

As used herein, the Mw of a polymer means the weight average molecular weight of the polymer while Mn means the number average molecular weight. In addition, in the present compositions, the increased high molecular weight polymer is reflected in the Mz value of the resin, the "z-average" molecular weight. The Mz of a resin is well known in the art to more accurately show the effect of high molecular weight constituents of a resin. For the purpose of defining the present invention, the molecular weight data for components having weight average molecular weights up to about 700,000 is determined by gel permeation chromatography (GPC). The GPC analysis in the present teachings can be done using a GPC column which is linear from Mw's of about 600 to about 2,000,000. In the case of the very high average molecular weight polymers (above 700,000 and higher), the molecular weight is accurately determined by the solution viscosity of a 10 percent solution of the polymer in toluene.

The ratio of the weight average and number average molecular weights, Mw/Mn, often called the dispersion index, is an indication of the broadness or narrowness of the distribution of molecular weights; the larger the number given by this ratio, the broader the molecular weight distribution. The molecular weight distribution can also be shown graphically by plotting the log of the molecular weight of very small polymer fractions on the X-axis, against the percentage of the total composition weight that such molecular weight polymer makes up, on the Y-axis, as in FIG. 3. This data can readily be determined by GPC and such plots are commonly called GPC curves. In general, the GPC curves for isothermal styrenic polymers are single-peaked, bell-shaped curves, the broad or narrow shape of the "bell" indicating broad or narrow distribution of the molecular weights of the polymer molecules. The term molecular weight distribution as used herein, generally refers to the shape of the curves obtained by GPC analysis of such polymers which is reflected in the Mw/Mn ratios.

In the polymerization of the high or intermediate molecular weight polymers, the method for initiation is not critical as long as the necessary average molecular weights and molecular weight distributions are achieved. For example, the polymerizations can be initiated free radically or anionically. Suitable conditions for thermal free radical initiation as well as suitable free radical and anionic initiator compositions are well known in the art. Representative free radical initiators include the peroxide initiators such as the peresters, e.g., tertiary butyl peroxybenzoate and tertiary butyl peroxyacetate, dibenzoyl peroxide, dilauroyl peroxide, 1,1-bis tertiary butyl peroxycyclohexane, 1,1-bis tertiary butyl peroxy-3,3,5-trimethyl cyclohexane and di-cumyl peroxide. Representative anionic initiators include the well known organo lithium initiators, such as n-butyl lithium.

The present invention involves blends of a major portion of intermediate molecular weight polymer and a minor portion of high molecular weight polymer. Most preferably, the high and intermediate molecular weight polymer components have the same composition (i.e., homopolymers of the same monomeric units or copolymers having the same comonomeric units in the same ratios).

It has been found that the optimum molecular weights for the two components in the compositions according to the present invention vary somewhat depending on the composition of the polymer. Although the present invention is not intended to be limited by theory, it is theorized that a particular polymer composition has a certain, minimum molecular weight that needs to be achieved before the polymer molecule chains begin to entangle and give the polymer composition its characteristic thermoplastic properties. This molecular weight is known as the entanglement molecular weight for the particular polymer composition. The entanglement molecular weights for polymer compositions vary according to the monomers which are present in the polymer or copolymer and also according to the relative percentage of the comonomers in a copolymer of two or more monomers. The desired average molecular weights for each of the two components which make up the compositions according to the present invention can be expressed as a function of the entanglement molecular weights of the component composition. Although the molecular weights of both the major and minor components of the presently claimed blend compositions differ for different monovinylidene aromatic polymer compositions (e.g., for polystyrene and poly-alpha-methyl-styrene), the molecular weights are determined by multiplying the entanglement molecular weights of the compositions (e.g., polystyrene and poly-alpha-methyl-styrene) by the same multipliers to determine the desired molecular weights for the major and minor components. These multipliers are hereinafter referred to as "entanglement molecular weight multipliers" and are represented by "E".

Various techniques for determining the entanglement molecular weight of a polymer composition are known in the art, as are the entanglement molecular weights for many different polymer compositions. See, for example, Jan. 25, 1966, *Chemical Reviews*, Volume 66, No. 1, pages 1 through 25, for an article by Porter and Johnson giving a general overview of this theory. See also a May, 1981 report by Donald and Kramer entitled "Effect of Molecular Entanglements on Craze Microstructure in Glassy Polymers" identified as MSC Report No. 4407 and available at the Department of Materials Science and Engineering, Materials Science Center, Cornell University, Ithaca, New York. For the purpose of the present invention the technique for the determination of entanglement molecular weight is the method published and described in a 1979 address by J. T. Seitz entitled "Measurements of Entanglement Length in Broad Molecular Weight Systems", presented at the 50th Golden Jubilee of the Rheology Society in Boston, Massachusetts. In this technique, a sample of polymer is examined by dynamic mechanical analysis. This is conveniently done using a Mechanical Spectrometer manufactured by Rheometrics, Inc. Such analysis is done using a frequency of 0.1 hertz and increasing the sample temperature at a rate of 1° C. per minute. In this way, the temperature and the storage modulus are found at the minimum point on the Tan δ curve (Tan $\delta_{min}$) after the temperature goes above the glass transition temperature of the sample. The following equation then can be used to calculate the entanglement molecular weight of that polymer composition.

$$\text{Entanglement Molecular Weight} = \frac{\rho RT_{min}}{G'_{min}} [1 - 0.36(\text{Tan}\delta_{min})]^{1.25}$$

where $\rho$ = density in grams per cubic centimeter at Tan $\delta_{min}$
R = gas constant
$T_{min}$ = temperature in degrees Kelvin at Tan $\delta_{min}$
$G_{min}'$ = storage modulus in dynes per square centimeter at Tan $\delta_{min}$.

This equation then gives the entanglement molecular weight for polymers having molecular weight distributions (Mw/Mn's) within the scope of the present invention. This technique or a technique which produces results consistent herewith should be used to determine entanglement molecular weights for the purpose of application of the present invention.

The entanglement molecular weight values for several polymers as determined by this technique are listed below.

| Entanglement Molecular Weights for Various Polymers | |
|---|---|
| Polymer | Entanglement Molecular Weight |
| Polystyrene | 19,100 |
| Random copolymer of styrene and α-methylstyrene (80/20) | 17,300 |
| Random copolymer of styrene and α-methylstyrene (50/50) | 12,600 |
| Random copolymer of styrene and acrylonitrile (64/36) | 11,600 |
| Poly para-vinyltoluene | 28,400 |
| Poly para-tertiarybutylstyrene | 43,400 |

The intermediate molecular weight monovinylidene aromatic polymer suitable for use in the present invention, hereinafter called the intermediate molecular weight polymer, is a monovinylidene aromatic polymer, as defined above. In general, the intermediate molecular weight polymer has a weight average molecular weight (Mw) within the range of about 5.2 to 12.6 times the entanglement molecular weight of the polymer composition of interest. Preferably the Mw of the intermediate molecular weight polymer is within the range of from about 6.3 to 9.4 times the entanglement molecular weight of the polymer of interest. In order to maintain the desired narrowness of the molecular weight distribution in the final blended polymer composition it is desirable to use an intermediate molecular weight polymer having a relatively narrow, symmetrical and single-peaked molecular weight distribution. Such polymers generally have a Mw/Mn value of from about 1 to about 3, preferably from about 1.5 to about 2.5. It is well known in the art how to produce monovinylidene aromatic polymers, especially styrenic polymers, of this type, and many are commercially available.

The intermediate molecular weight polymer generally comprises the major portion of the presently claimed polymer composition. Desirably, from about 65 to about 98 parts by weight of intermediate molecular weight polymer are included in the polymer composition, more preferably from about 75 to about 93 parts by weight.

The particular amounts and average molecular weights of the intermediate molecular weight polymers used in the compositions of the present invention can vary within the above-described ranges depending on which properties of the resultant composition are desired to be maximized. Larger amounts of intermediate molecular weight polymer or intermediate molecular weight polymers having lower average molecular weights (but within the above-described ranges) can be utilized to achieve higher melt flow rates in the polymer composition while the higher average molecular weights and lesser amounts will produce resin compositions which are tougher and more heat resistant.

The high molecular weight monovinylidene aromatic polymer, hereinafter referred to as the high molecular weight polymer, is a monovinylidene aromatic polymer, as defined above. The high molecular weight polymer usually has a Mw in the range of about 20.9 to 99.5 times the entanglement molecular weight, preferably in the range of about 31.4 to 52.4 times the entanglement molecular weight. As with the intermediate molecular weight polymer, it is desirable, in order to maintain a narrow molecular weight distribution in the final polymer composition, to choose a high molecular weight polymer having a relatively narrow and single-peaked molecular weight distribution. Suitable high molecular weight polymers typically have an Mw/Mn value of from about 1 to about 3, preferably from about 1.5 to about 2.5. The various processes by which such polymers can be made are generally known in the art. Such processes usually require lower temperatures and lower initiator concentrations than processes producing lower molecular weight styrenic polymers. Preferably the high molecular weight and low molecular weight polymers are the same species of monovinylidene aromatic polymer. Very preferably they are both polystyrene.

The amount of high molecular weight poymer included in the final polymer composition generally ranges from about 2 to about 35 parts by weight, preferably from about 7 to about 25. The amount of such polymer required to achieve the desired benefits in the final product is dependent on the Mw of such high molecular weight polymer, lesser amounts of the higher molecular weight polymers being required.

The present invention is particularly applicable to polystyrene and the above relationship can be readily illustrated with polystyrene resin. It has been determined by the method described above that the entanglement molecular weight of polystyrene is about 19,100. Therefore, polystyrene resins according to the present invention comprise an intermediate molecular weight component having an Mw of from about 100,000 to about 240,000, preferably from about 120,000 to about 180,000. The high molecular weight component of a polystyrene resin according to the present invention has an Mw of from about 400,000 to about 1,900,000, preferably from about 600,000 to about 1,000,000.

The preferred relationship between the entanglement molecular weight multiple (E), also referred to as the entanglement molecular weight multiplier, for the high molecular weight polymer and the amount of such polymer desirably included in the presently claimed monovinylidene aromatic polymer compositions is shown in FIG. 1. As is obvious from the discussion above, the entanglement molecular weight multiple (E) for a polymer component is equal to the weight average molecular weight divided by the entanglement molecular weight for the polymer compositions. The various suitable combinations of "E" and "Amount" of high molecular weight polymer are approximately indicated in FIG. 1 by the points within the area defined by the sides of quadrangle ABCD. The combinations of "E" and "Amount" represented approximately by the points within the area defined by quadrangle EFGH in FIG. 1, when combined with intermediate molecular weight polymer have been found to produce preferred polymer compositions.

Figure 2:
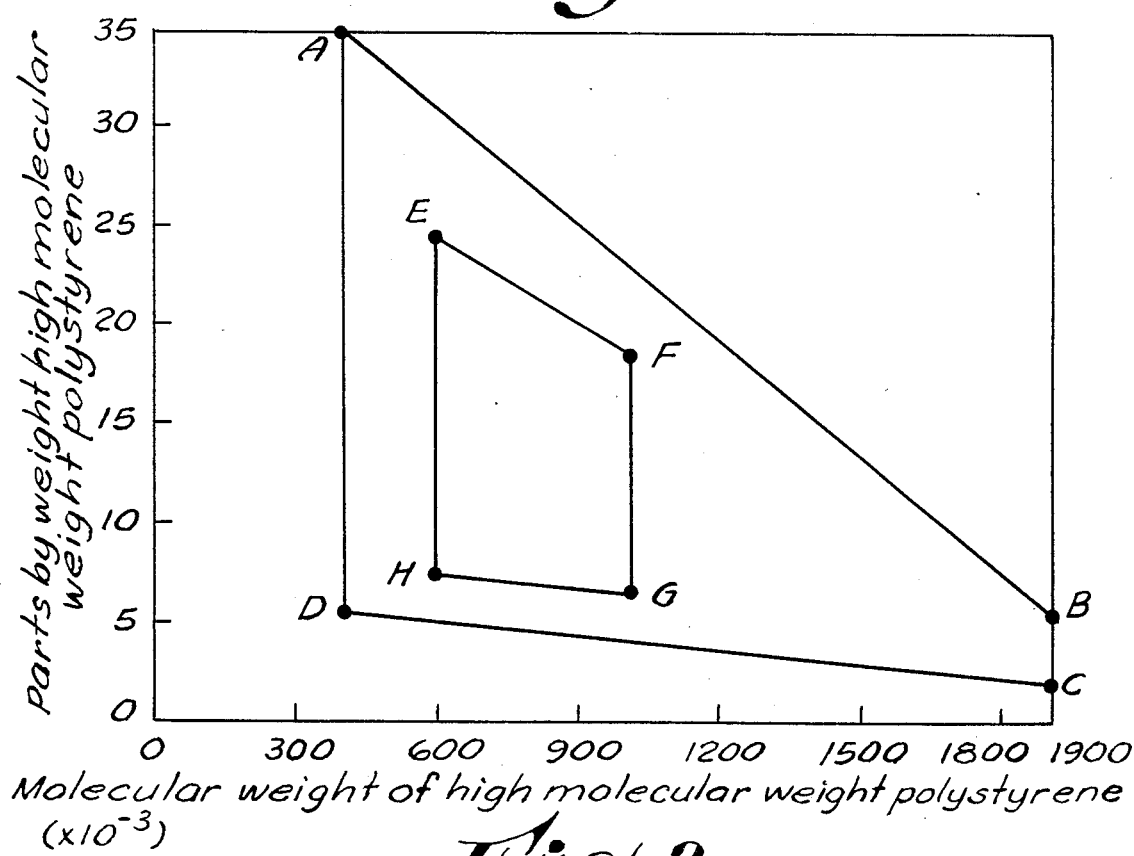
FIG. 2 is a graphical illustration of the relationship between the weight average molecular weight of high molecular weight polystrene and the amount of such polystyrene suitable for use in achieving the present invention.

FIG. 2 illustrates the application of the present invention to polystyrene which has an entanglement molecular weight of about 19,100.

The use of about 10 parts by weight of a high molecular weight component having a weight average molecular weight of about 41.9 times the entanglement molecular weight produces preferred monovinylidene aromatic polymer compositions. For example, in the case of polystyrene resins according to the present invention, about 10 parts by weight of a high molecular weight polystyrene having an Mw of about 800,000 is especially desirable in combination with an intermediate molecular weight polystyrene.

The relationship between the "E" values and Amounts of the high molecular weight polymers suitable for use in the present invention, as represented graphically in FIG. 1, can also be translated into a mathematical equation based on the equations for lines AB, DC, EF and HG. In this manner it has been determined that for high molecular weight polymers having E values in the range of from about 20.9 to 99.5 times the entanglement molecular weight, the amount of high molecular weight polymer that should be included in the present compositions in parts by weight is at least about the number given by the formula:

$$(-0.038)E + 5.8 \qquad \text{I}$$

and such amount is not greater than about the number given by the formula:

$$(-0.382)E + 43, \qquad \text{II}$$

wherein Mw is the weight average molecular weight of the high molecular weight polymer. Preferably the E value of the high molecular weight polymer is in the range of from about 31.4 to about 52.4 and the number of parts by weight of high molecular weight polymer is at least about the number given by the formula:

$$(-0.038)E + 8.7 \qquad \text{III}$$

and not greater than about the number given by the formula:

$$(-0.287)E + 34. \qquad \text{IV}$$

The relationship between the Mw's and Amounts of high molecular weight polystyrene suitable for use in the present invention, as represented graphically in FIG. 2, can also be translated into a mathematical equation based on the equations for lines AB, DC, EF and HG. In this manner it has been determined that for high molecular weight polystyrene components having Mw's in the range of from about 400,000 to about 1,900,000, the amount of high molecular weight polymer that should be included in the present compositions in parts by weight is at least about the number given by the formula:

$$(-2.0 \times 10^{-6})Mw + 5.8 \qquad \text{I-A}$$

and such amount is not greater than about the number given by the formula:

$$(-2.0 \times 10^{-5})M_w + 43, \qquad \text{II-A}$$

wherein Mw is the weight average molecular weight of the high molecular weight polymer. Preferably the Mw of the high molecular weight polymer is in the range of from about 600,000 to about 1,000,000 and the number of parts by weight of high molecular weight polymer is at least about the number given by the formula:

$$(-2.0 \times 10^{-6})M_w + 8.7 \qquad \text{III-A}$$

and not greater than about the number given by the formula:

$$(-1.5 \times 10^{-5})M_w + 34. \qquad \text{IV-A}$$

As previously stated small amounts of a plasticizer, such as mineral oil but less than 0.5 percent by weight may be employed in the invented composition. The unique properties obtained by combining the high molecular weight and intermediate molecular weight portion result in good melt flow properties without the use of substantial amounts of plasticizers thereby avoiding smoke formation during molding or loss of tensile strength in molded articles. A preferred composition comprises less than about 0.1 percent by weight of a plasticizer. Highly preferably the present composition is substantially devoid of plasticizer. Most preferably the compostion consists essentially of components (a) and (b). The present compositions may of course contain amounts of other commonly used additives such as, for example, fillers, stabilizers, pigments and impact modifiers such as rubber.

The method and order of the inclusion of the high molecular weight polymer and the intermediate molecular weight polymer together into the present monovinylidene aromatic polymer compositions is not critical to the present invention as long as they are very well mixed. For example, compositions according to the present invention can be achieved by physically admixing separately produced intermediate and high molecular weight polymers. The presently claimed compositions can also be prepared by preparing one or the other of the two requisite polymers under one set of polymerization conditions, then preparing the second polymer in the presence of the previously prepared polymer under a different set of polymerization conditions.

Figure 3:
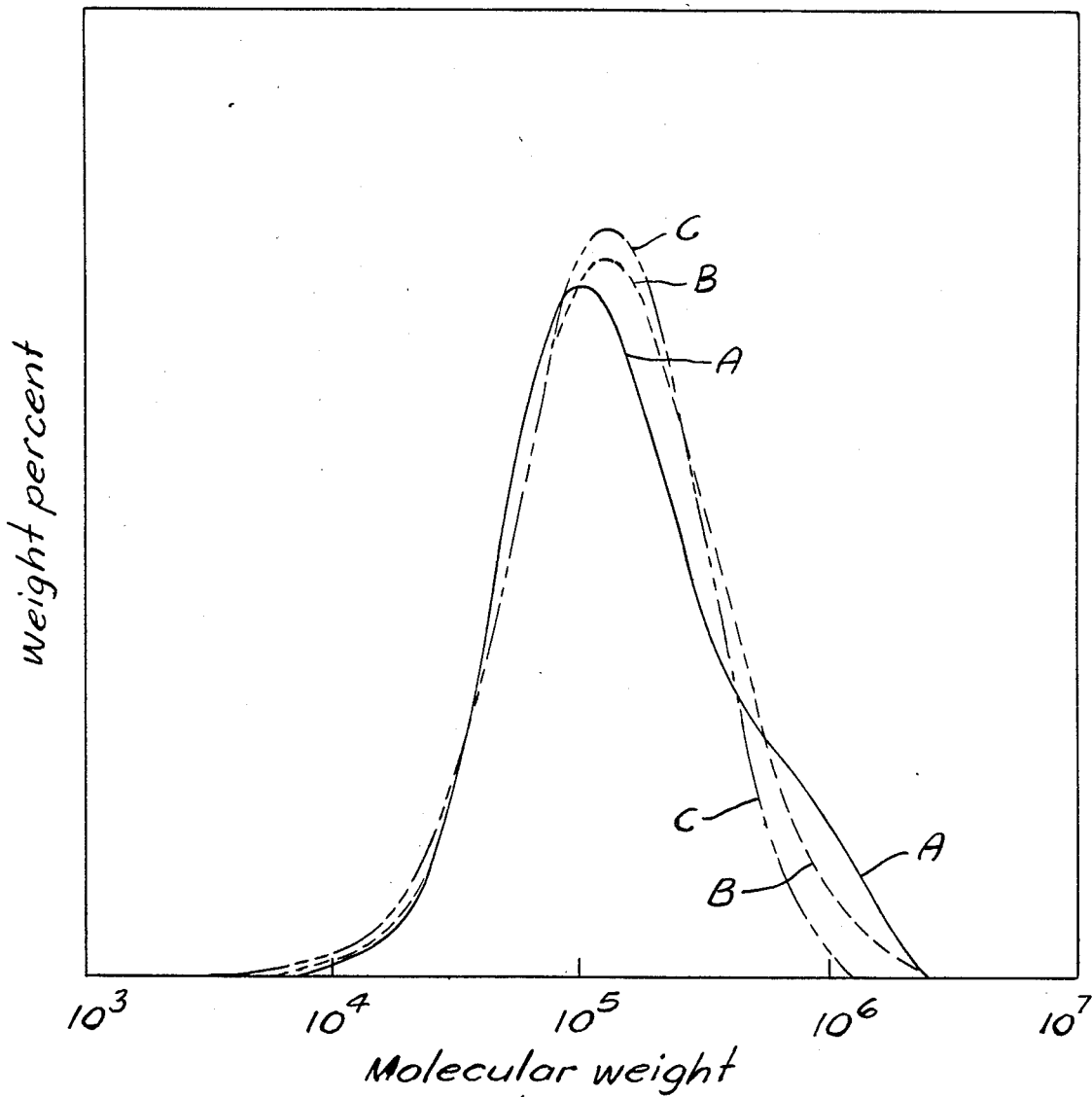
FIG. 3 is a composite of several curves obtained by GPC analysis of polystyrene compositions illustrating the differences between the GPC curves obtained from samples prepared in accordance with the present teachings and an isothermally polymerized polystyrene.

What is critical in the present invention is to achieve a molecular weight distribution in the resultant composition which gives a GPC curve having a shape similar to curves A or B on FIG. 3. Curves A and B, represent polystyrene resins described in the Examples 13 and 9, below, containing 20 and 10 percent high molecular weight polymer respectively. Curves A and B both can be said to "have a shoulder on" or "tilt toward" the high molecular weight side, as compared to Curve C in FIG. 3. Curve C is an example of an isothermally prepared polystyrene having a normal, balanced molecular weight distribution. As is well known in the art, an isothermal polymer is one which is prepared under substantially consistent polymerization conditions and has a normal, balanced molecular weight distribution such as is illustrated by curve C of FIG. 3.

Figure 4:
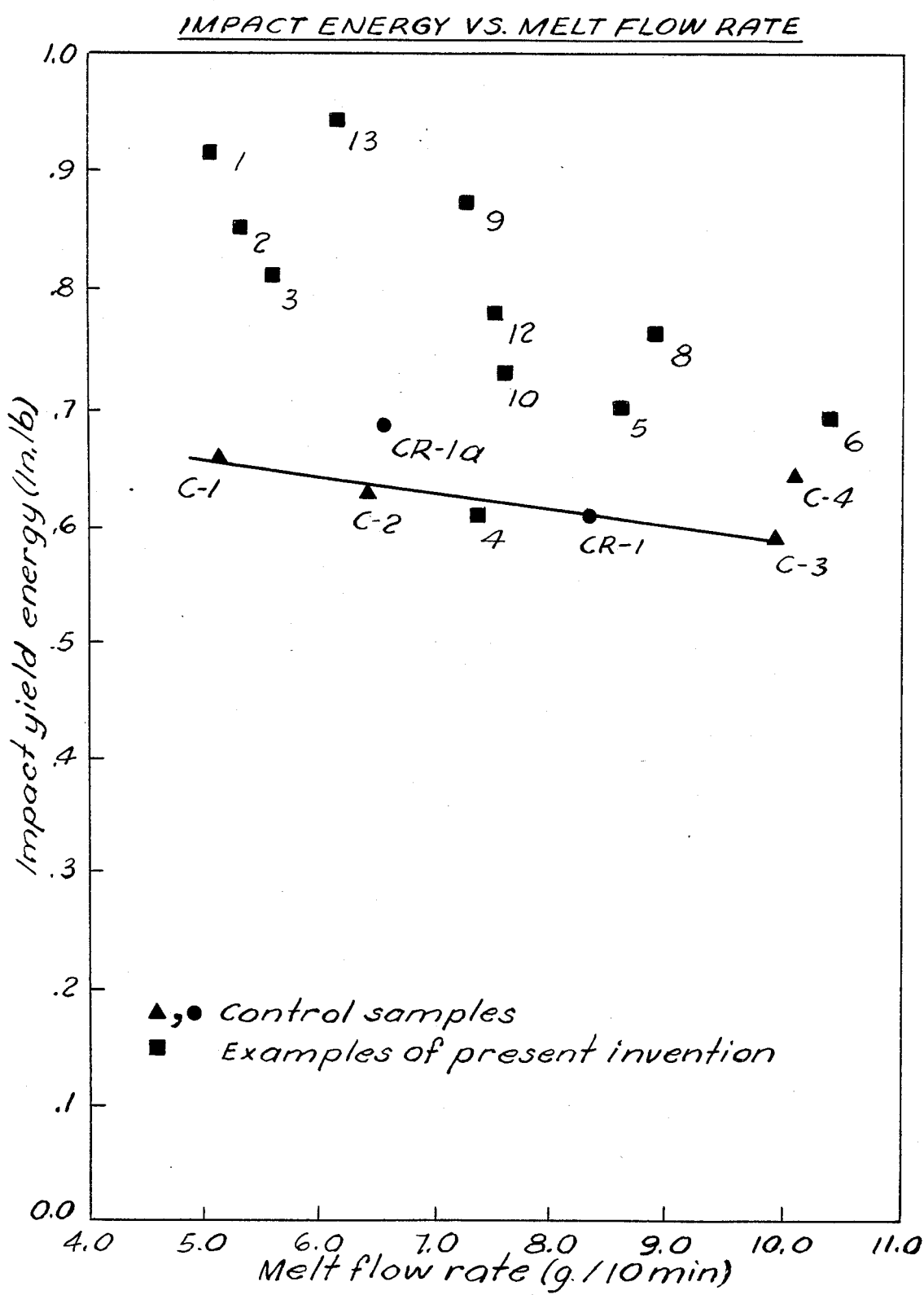
FIG. 4 is a plot of the energy required to break a molded resin sample versus the MFR of that resin for various resins.

As is shown in FIG. 4, polystyrene compositions prepared according to the present teachings, not containing any plasticizing additive such as mineral oil have better combinations of melt flow rate and impact resistance than isothermal polystyrene resins. FIG. 4 is a plot of the total energy expended in breaking a sample molded from a non-plasticized resin versus the melt flow rate of that resin, in the so-called medium-to-easy flow range of MFR's. The identifying numbers for the points on FIG. 4 correspond to the comparative example compositions, sample compositions and commercial resins identified and described below.

As mentioned above, isothermal polymers are generally polymerized at a single temperature or within a narrow temperature range and have a normal, bell-shaped, single-peaked molecular weight distribution as in Curve C in FIG. 3. The points representing non-plastified, isothermal polystyrenes on FIG. 4 (i.e., C-1, C-2, C-3, and C-4) in general form a line and illustrate the direct relationship, a trade-off, between impact strength and melt flow rate. The points representing most of the resin compositions according to the present teachings are generally above the line, showing such resins to have better combinations of melt flow and impact resistance properties than the isothermal polystyrenes. It should also be noted that the heat resistance values of the resins according to the present invention, though not shown in FIG. 3, additionally contribute to their superiority. In other words, resin compositions prepared according to the present teachings generally have combinations of better impact resistance, melt flow rate and heat resistance than isothermal polymer resins of the same type.

In a preferred mode of operation, in a continuous polymerization process, a group of different reactors or several distinct reaction zones within one or more reactors are used in series to create the different molecular weight polymers. The different zones or reactors having the proper relative volumes are maintained at the requisite temperatures and supplied with the appropriate reactants necessary to produce the desired amounts of polymer having the specified molecular weights, such that compositions according to the present invention are produced. In this type of a system, the final product of the process is a blend of two different molecular weight polymers obtained without a separate blending step. One of the polymers is produced in the presence of the other and the two thereby admixed.

In an especially preferred mode of operation, an earlier polymerization reactor or zone is maintained such that the high molecular weight polymer is produced, while a later reactor or zone receives the reaction mixture from the earlier reactor or zone, including the high molecular weight polymer. The later reactor or zone is optionally supplied with additional reactants and is otherwise maintained such that it produces an intermediate molecular weight polymer in the presence of the previously produced high molecular weight polymer, a blend of the two components being achieved thereby. Usually, the earlier high molecular weight polymer-producing reactor or zone is at a lower temperature than the subsequent intermediate molecular weight polymer-producing reactor or zone.

EXAMPLES

In the discussions of the following polymer compositions, various test methods are used to determine the characteristic properties of and describe said compositions.

The molecular weight characterization is done via solution viscosity determinations (SV) or gel permeation chromatography (GPC). The methods of determination (SV or GPC) are indicated for the compositions tested.

Melt flow rates (MFR's) are determined according to ASTM (American Society for Testing Materials) standard test method D-1238-79, Condition G.

Vicat heat distortion temperatures are determined according to ASTM standard test D-1525-76 using compression molded samples.

The tensile strength, elongation and flex strength of compression molded samples are measured for sample compositions which are compression molded at 390° F. These measurements are made using the Instron Model 1122, the tensile strength and elongation being determined according to ASTM D-638 at 0.2 in/min, while the flex strength is determined in accordance with ASTM D-790-71.

Though styrenic polymers in general are brittle (i.e., have poor impact resistances) compared to some other polymer compositions, impact resistance differences between various of these polymers can be noticed during molding or use of molded articles and in some types of testing conditions. In the present application, Rheometric testing procedures are found to best illustrate these impact resistance differences.

Instrumented impact resistance data is obtained using a Rheometrics High Rate Impact Tester manufactured by Rheometrics, Inc., 2438 Highway No. 2, Union, N.J. This unit utilizes a ram moving at 1,000 inches per minute to break molded specimens at room temperature and measures the force required and the total energy expended in breaking the resin specimens. The resin specimens are round, two-inch injection molded discs supported by a ring having a one and a half inch diameter.

In order to illustrate the practical advantages of the present resins over similar, commercially available general purpose polystyrene resins, the different resins are run, in series, on a Husky injection molding machine which molds the resins into plastic cups or tumblers. This test shows, by finding the maximum rate at which quality tumblers can be produced from each resin, the good combination of melt flow and heat resistance properties possessed by the present resins. The molding runs then provide injection molded resin articles (the tumblers) which can be evaluated for their practical strength and heat resistance. The tumbler strength is evaluated on an Instron to find the force required to rupture the cup. The cup lip is compressed between the jaws of the Instron at 10 inches per minute and the ultimate force to rupture the cup is found. The strength is also measured by a screw-actuated "cup buster" to find the amount the cup flexes before rupturing. In this test, a ram compresses the cup lip at a rate of about 3 inches per minute and the percent flex to rupture is determined according to the following equation:

$$\% \text{ flex to rupture} = \frac{\text{the distance cup flexes}}{\text{original cup lip diameter}} \times 100$$

COMPARATIVE EXAMPLES—ISOTHERMAL POLYSTYRENE

In the following comparative examples, C-1 through C-4, not examples of the present invention, intermediate molecular weight polymers are prepared isothermally to illustrate the typical relationship between molecular weights, melt flow rates, vicat heat distortion temperatures and impact resistances of such polymers. These intermediate molecular weight polymers are then compared with compositions according to the present invention to illustrate the improved combinations of melt flow rates, vicat heat distortion temperatures and impact resistances which can be achieved by the practice of the present invention.

The sample compositions are prepared by feeding a solution of styrene and ethyl benzene solvent into a reactor and subjecting them to polymerization conditions as summarized below. The polymerization is carried out to high solids, the reaction mass then devolatilized and the resultant polymer pelletized. The molecular weight data and the other properties (determined as above-described) are summarized in Table I, below.

TABLE I

COMPARATIVE EXAMPLES
ISOTHERMAL POLYSTYRENE

| | C-1 | C-2 | C-3 | C-4 |
|---|---|---|---|---|
| Feed Composition | | | | |
| Styrene[1] | 90% | 90% | 90% | 88% |
| Solvent[2] | 10% | 10% | 10% | 12% |
| Reaction Conditions | | | | |
| Temperature | 151° C. | 156° C. | 160° C. | 160° C. |
| Time | 3.0 hr. | 1.7 hr. | 1.7 hr. | 1.9 hr. |
| Percent Solids[3] | 70% | 70% | 64% | 63% |
| Molecular Weight Data | | | | |
| Mw | 209,000 | 198,000 | 172,000 | 173,000 |
| Mz | 393,000 | 355,000 | 335,000 | 314,000 |
| $\frac{Mw}{Mn}$ | 2.31 | 2.05 | 2.16 | 2.01 |
| Polymer Properites | | | | |
| MFR (g/10 min.)[4] | 5.11 | 6.43 | 9.92 | 10.08 |
| VHD (°C.)[5] | 106 | 106 | 106 | 106 |
| Tr (psi)[6] | 6,448 | 6,145 | 6,050 | 5,773 |
| % Elongation[7] | 1.37 | 1.42 | 1.31 | 1.29 |
| Flex Strength (psi)[8] | 9,386 | 8,294 | 7,136 | 6,952 |
| Rheometric Testing[9] | | | | |
| Yield Force (lb.)[10] | 46.4 | 44.2 | 45.3 | 45.3 |
| Yield Energy (in. lb.)[11] | 0.66 | 0.63 | 0.59 | 0.64 |

Footnotes:
[1]Weight percent styrene in feed stream based on total weight of the feed stream.
[2]Weight percent ethyl benzene (EB) solvent in feed stream.
[3]Weight percent solids in the reaction mass prior to devolatilization and polymer recovery.
[4]Melt Flow Rate in grams per 10 minutes.
[5]Vicat Heat Distortion in °C.
[6]Tensile strength at rupture in pounds per square inch.
[7]Percent elongation.
[8]Flex strength in pounds per square inch.
[9]Instrumented impact testing done on a Rheometrics, Inc. test unit at 1,000 inches per minute ram speed on 2 inch injection molded disc samples on a 1½ inch support ring.
[10]Force in pounds required to break a sample molded from the resin.
[11]Energy in inch pounds required to break a sample molded from the resin.

PREPARATION OF HIGH MOLECULAR WEIGHT POLYMER-CONTAINING COMPONENTS

The following sample compositions are prepared by polymerizing an intermediate molecular weight polymer in the presence of a previously prepared high molecular weight polymer. It should be noted that, though the following examples are prepared in this manner, compositions according to the present invention can be prepared in many other ways and still be within the scope of the claims.

High molecular weight components A through D below, comprising high molecular weight polymer, are produced by polymerizing styrene at a low temperature and low conversion rate as described below, to yield a viscous solution of the high molecuar weight polymer in unreacted styrene monomer, i.e., partial polymer. These high molecular weight components are then used to prepare the final blend compositions according to the present invention.

High Molecular Weight Component "A"

Styrene monomer is polymerized in a stirred reactor at 110° C. for 6 hours under a nitrogen atmosphere of 20 pounds per square inch (psi) of pressure. This results in conversion of 27.9 percent of the monomer to polymer. Gel permeation chromatography is used to determine the molecular weight.

High Molecular Weight Component "B"

The procedure in A is followed with the differences and results shown below:

| Reaction Temperature | 60° C. |
|---|---|
| Duration of Reaction | 195 hours |
| % Conversion | 10.1% |
| Solution Viscosity | 2,620 cps |
| Mw (SV) | 1,410,000 |

High Molecular Weight Component "C"

The procedure in A is followed with the following differences and results:

| Reaction Temperature | 90° C. |
|---|---|
| Duration of Reaction | 26 hours |
| % Conversion | 23.7% |
| Solution Viscosity | 339 cps |
| Mw (SV) | 820,000 |

High Molecular Weight Component "D"

This component is produced somewhat unconventionally, in that a bottle of styrene monomer is maintained at room temperature, about 30° C., for about one year. In this way the styrene is about 73 percent converted to polymer. The molecular weight is determined by solution viscosity to be about 1,890,000.

The reaction times, reaction temperatures, conversion percentages, and molecular weights for the high molecular weight components are summarized in Table II, below.

TABLE II

| | Reaction Temperature | Reaction Time | Molecular Weight | Entanglement Molecular Weight Multiplier |
|---|---|---|---|---|
| Component "A" | 110° C. | 6 hrs | 500,000 | 26.2 |
| Component "B" | 60° C. | 195 hrs | 1,400,000 | 73.3 |
| Component "C" | 90° C. | 26 hrs | 800,000 | 41.9 |
| Component "D" | ~30° C. | ~1 year | 1,900,000 | 99.5 |

PREPARATION OF SAMPLE COMPOSITIONS 1–3

The high molecular weight components, as described above, in the form of thick, syrup-like solutions of the high molecular weight polymer in the unreacted styrene monomer are dissolved in additional styrene monomer and ethyl benzene solvent and the solution fed into a reactor where it is subjected to polymerization conditions to polymerize the styrene monomer to form the intermediate molecular weight portion of the blend composition.

The high molecular weight components (high molecular weight partial polymer) are used in amounts sufficient to give the desired final concentration of high molecular weight polymer in the resultant blend based on predicted amounts of conversion of monomer to intermediate molecular weight polymer. The polymerization is carried out to high (above 50%) solids, the reaction mass then devolatilized and the resultant blend composition then pelletized or granulated. The reaction parameters and other information are set out in Table III below for the various examples. The amounts of high molecular weight polymer in blend compositions 1 through 3 are determined by knowing the amount of high molecular weight polymer in the high molecular weight component (percent solids) and assuming that it all passes through the second polymerization (formation of the intermediate molecular weight polymer).

The amounts and weight average molecular weights of the intermediate molecular weight polymers in the blend compositions are not directly nor precisely measurable in the below-described process for making the blend compositions. It is possible, however, to accurately calculate the weight average molecular weights of the intermediate molecular weight polymers which are produced in the below process. The Mw of an intermediate molecular weight polymer is calculated from the Mn of such polymer which in turn is calculated from the overall Mn of the blend of which the intermediate molecular weight polymer is a part and the Mn of the high molecular weight polymer, knowing the percent by weight of the blend which the high molecular weight polymer makes up. This calculation is also based on the assumption that, for the intermediate molecular weight polymer, Mw/Mn is very nearly equal to 2, which is a valid assumption in view of the polymerization conditions.

The compositions and properties of the sample compositions prepared and tested as described above are summarized in Table III, below.

TABLE III

| | Sample Composition No. | | |
|---|---|---|---|
| | 1 | 2 | 3 |
| Feed Composition | | | |
| Styrene[1] | 32% | 56% | 85% |
| High molecular weight component[2] | 58% A | 34% A | 5% D |
| Solvent[3] | 10% EB | 10% EB | 10% EB |
| Reaction Conditions | | | |
| Temperature | 163° C. | 161° C. | 160° C. |
| Time | 1.2 hr. | 1.6 hr. | 1.2 hr. |
| Percent Solids[4] | 66% | 70% | 54% |
| Final Composition | | | |
| High molecular weight polymer[5] | 25% 500,000 | 14% 500,000 | 6% 1,900,000 |
| Intermediate molecular weight polymer[6] | 75% 165,000 | 86% 170,000 | 94% 165,000 |
| Mw | 239,000 | 229,000 | 244,000 |
| Mz | 500,000 | 522,000 | 840,000 |
| Mw/Mn | 2.41 | 2.44 | 2.80 |
| Properties | | | |
| MFR (g/10 min)[7] | 5.04 | 5.38 | 5.66 |
| VHD (°C.)[8] | 106 | 106 | 106 |
| Tr (psi)[9] | 6,034 | 6,087 | 5,768 |

TABLE III-continued

|  | Sample Composition No. | | |
| --- | --- | --- | --- |
|  | 1 | 2 | 3 |
| % Elongation[10] | 1.36 | 1.45 | 1.35 |
| Flex Strength (psi)[11] | 7,710 | 7,514 | 6,902 |
| Rheometrics[12] | | | |
| Yield Force (lb)[13] | 56.6 | 53.0 | 50.9 |
| Yield Energy (in. lb.)[14] | 0.91 | 0.85 | 0.81 |

Footnotes:

[1]Weight percent styrene in feed stream based on total weight of the feed stream.
[2]Weight percent high molecular weight component, as identified in Table I, above, in the feed stream, the high molecular weight components, as discussed above, consist of high molecular weight polymer dissolved in styrene monomer.
[3]Weight percent ethyl benzene (EB) solvent in feed stream.
[4]Weight percent solids in the reaction mass prior to devolatilization and polymer recovery.
[5]Weight percent and molecular weight (Mw) of high molecular weight polymer in blend composition.
[6]Weight percent and molecular weight (Mw) of intermediate molecular weight polymer in blend composition.
[7]Melt Flow Rate in grams per 10 minutes.
[8]Vicat Heat Distortion in °C.
[9]Tensile strength at rupture in pounds per square inch.
[10]Percent elongation.
[11]Flex strength in pounds per square inch.
[12]Instrumented impact testing done on a Rheometrics, Inc. test unit at 1,000 inches per minute ram speed on 2 inch injection molded disc samples on a 1½ inch support ring.
[13]Force in pounds required to break a sample molded from the resin.
[14]Energy in inch pounds required to break a sample molded from the resin.

PREPARATION OF SAMPLE COMPOSITONS 4 THROUGH 9

The following samples are prepared generally the same as the earlier samples except that an initiator, 1,1-bis-t-butylperoxycyclohexane is added for the polymerization of the intermediate molecular weight component. The preparation and physical properties of the various sample compositions are summarized in Table IV, below.

TABLE IV

|  | Sample Composition No. | | | | | |
| --- | --- | --- | --- | --- | --- | --- |
|  | 4 | 5 | 6 | 7 | 8 | 9 |
| Feed Composition | | | | | | |
| Styrene[1] | 79% | 79% | 80% | 80% | 80% | 80% |
| High molecular weight component[2] | 11% B | 11% B | 10% C | 10% C | 10% C | 10% C |
| Solvent[3] | 10% EB | 10% EB | 10% EB | 10% EB | 10% EB | 10% EB |
| Initiator[4] | 460 ppm | 460 ppm | 555 ppm | 470 ppm | 470 ppm | 440 ppm |
| Reaction Conditions | | | | | | |
| Temperature | 144° C. | 147° C. | 155° C. | 148° C. | 148° C. | 144° C. |
| Time | 1.2 hr. | 1.1 hr. | 0.65 hr. | 0.86 hr. | 0.86 hr. | 1.0 hr. |
| Percent Solids[5] | 50% | 49% | 50% | 48% | 49% | 48% |
| Final Composition | | | | | | |
| High molecular weight polymer[6] | 5% 1,400,000 | 5% 1,400,000 | 10% 800,000 | 10% 800,000 | 10% 800,000 | 10% 800,000 |
| Intermediate molecular weight polymer[7] | 95% 170,000 | 95% 160,000 | 90% 148,000 | 90% 153,000 | 90% 157,000 | 90% 155,000 |
| Mw | 213,000 | 203,000 | 206,000 | 200,000 | 199,000 | 213,000 |
| Mz | 647,000 | 600,000 | 563,000 | 516,000 | 507,000 | 574,000 |
| Mw/Mn | 2.40 | 2.42 | 2.56 | 2.39 | 2.32 | 2.53 |
| Properties | | | | | | |
| MFR (g/10 min.)[8] | 7.40 | 8.60 | 10.41 | 9.21 | 8.95 | 7.33 |
| VHD (°C.)[9] | 107 | 107 | 107 | 108 | 108 | 108 |
| Tr (psi)[10] | 6,272 | 5,966 | 5,397 | 5,745 | 5,966 | 6,272 |
| % Elongation[11] | 1.53 | 1.36 | 1.28 | 1.32 | 1.46 | 1.49 |
| Flex Strength (psi)[12] | 7,864 | 7,158 | 6,548 | 6,908 | 7,241 | 7,915 |
| Rheometrics Test[13] | | | | | | |
| Yield Force (lb.)[14] | 41.5 | 45.9 | 44.8 | * | 49.2 | 52.5 |
| Yield Energy (in. lb.)[15] | 0.61 | 0.70 | 0.69 | * | 0.76 | 0.87 |

Footnotes:
[1]Weight percent styrene in feed stream based on total weight of the feed stream.
[2]Weight percent high molecular weight component, as identified in Table I, above, in the feed stream, the high molecular weight components, as discussed above, consist of high molecular weight polymer dissolved in styrene monomer.
[3]Weight percent ethyl benzene (EB) solvent in feed stream.
[4]Parts per million 1,1-bis-t-butylperoxycyclohexane initiator, based on total weight of the feed stream.
[5]Weight percent solids in the reaction mass prior to devolatilization and polymer recovery.
[6]Weight percent and molecular weight (Mw) of high molecular weight polymer in blend composition.
[7]Weight percent and molecular weight (Mw) of intermediate molecular weight polymer in blend composition.
[8]Melt Flow Rate in grams per 10 minutes.
[9]Vicat Heat Distortion in °C.
[10]Tensile strength at rupture in pounds per square inch.
[11]Percent elongation.
[12]Flex strength in pounds per square inch.
[13]Instrumented impact testing done on a Rheometrics, Inc. test unit at 1,000 inches per minute ram speed on 2 inch injection molded disc samples on a 1½ inch support ring.
[14]Force in pounds required to break a sample molded from the resin.
[15]Energy in inch pounds required to break a sample molded from the resin.
*Indicates quantity not determined.

PREPARATION OF SAMPLE COMPOSITIONS 10 AND 11

In these examples a continuous polymerization process is used whereby the high molecular weight polymer is produced in the early stages and fed continuously into a later stage where the intermediate molecular weight portion is polymerized. Styrene containing 25 parts per million 1,1-bis-t-butylperoxycyclohexane initiator is fed into the high molecular weight polymerization zone which is maintained at about 88° C. The average residence time in the high molecular weight polymerization zone is about 8.3 hours and about 10 percent by weight of this feed is polymerized to polymer having an Mw of 725,000. This stream, containing 10 percent solids, as well as another styrene/ethyl benzene/initiator feed stream is supplied to the intermediate molecular weight polymerization zone. The temperature of this zone is held at 141° C. to produce sample polymers having the specified intermediate molecular weight polymer. From this zone the reaction mass containing 40 to 50 percent solids, also summarized below, is fed to the devolatilizer where a small amount of polymerization continues until the monomer is removed. After devolatilization, the polymer was pelletized. Example 11, as indicated below, additionally contains about 2 percent mineral oil incorporated into the polymer in the styrene/ethyl benzene/initiator feed stream which is supplied to the intermediate molecular weight polymerization zone. The intermediate molecular weight polymerization reaction conditions and final product characteristics are summarized in Table V, below.

TABLE V

|  | Sample Composition No. | |
|---|---|---|
|  | 10 | 11 |
| Intermediate Molecular Weight Polymerization Reaction Conditions |  |  |
| Feed[1] |  |  |
| Styrene[2] | 80% | 79% |
| Solvent[3] | 20% | 20% |
| Mineral Oil[4] | 0 | 1.1% |
| Initiator[5] | 370 ppm | 370 ppm |
| Temperature | 141° C. | 141° C. |
| Time[6] | 8.3 hr. | 8.3 hr. |
| Percent Solids[7] | 43% | 45% |
| Final Composition |  |  |
| High Molecular Weight Polymer[8] | 10% 725,000 | 10% 725,000 |
| Intermediate Molecular Weight Polymer[9] | 90% 151,000 | 87.5% 144,000 |
| Mineral Oil | 0 | 2.5% |
| Mw | 214,000 | 215,000 |
| Mz | 505,000 | 532,000 |
| Mw/Mn | 2.60 | 2.74 |
| Properties |  |  |
| MFR (g/10 min.)[10] | 7.61 | 11.65 |
| VHD (°C.)[11] | 107 | 100 |
| Tr (psi)[12] | 6,314 | 5,864 |
| % Elongation[13] | 1.53 | 1.31 |
| Flex Strength[14] | 7,653 | 7,900 |
| Rheometrics Test[15] |  |  |
| Yield Force (lb.)[16] | 47.0 | 52.5 |

TABLE V-continued

|  | Sample Composition No. | |
|---|---|---|
|  | 10 | 11 |
| Yield Energy (in. lb.)[17] | 0.73 | 0.87 |

Footnotes:
[1] Feed stream not including the 10% solids high molecular weight partial polymer.
[2] Weight percent styrene in feed stream based on total weight of the feed stream.
[3] Weight percent ethyl benzene (EB) solvent in feed stream.
[4] Weight percent mineral oil in feed stream.
[5] Parts per million 1,1-bis-t-butylperoxycyclohexane initiator, based on total weight of the feed stream.
[6] Residence time in intermediate molecular weight polymerization zone.
[7] Weight percent solids in the reaction mass prior to devolatilization and polymer recovery.
[8] Weight percent and molecular weight (Mw) of high molecular weight polymer in blend composition.
[9] Weight percent and molecular weight (Mw) of intermediate molecular weight polymer in blend composition.
[10] Melt Flow Rate in grams per 10 minutes.
[11] Vicat Heat Distortion in °C.
[12] Tensile strength at rupture in pounds per square inch.
[13] Percent elongation.
[14] Flex strength in pounds per sqaure inch.
[15] Instrumented impact testing done on a Rheometrics, Inc. test unit at 1,000 inches per minute ram speed on 2 inch injection molded disc samples on a 1½ inch support ring.
[16] Force in pounds required to break a sample molded from the resin.
[17] Energy in inch pounds required to break a sample molded from the resin.
*Indicates quantity not determined.

PREPARATION OF SAMPLE COMPOSITIONS 12 and 13

In these samples, amounts of Sample Composition 6 produced as described above, before being devolatilized, are combined with added amounts of high molecular weight components "C" or "B", then the combination is devolatilized to give Sample Compositions 12 and 13 as described below in Table VI. As described above, Sample Composition 6, when devolatilized, consists of 10 percent high molecular weight polymer (from high molecular weight component "C") having a weight average molecular weight of about 800,000 and 90 percent of an intermediate molecular weight polymer having a molecular weight of about 148,000. In Sample Composition 12, some additional molecular weight degradation appears to occur.

In compositions 12 and 13, additional amounts of high molecular weight component "C" are added to yield devolatilized compositions having 15 and 20 percent, respectively, of the high molecular weight polymer present therein. The ingredients and properties of the resultant compositions are summarized below in Table VI.

TABLE VI

|  | Sample Composition No. | | |
|---|---|---|---|
|  | 6 | 12 | 13 |
| Intermediate molecular weight polymer[1] | 90% 148,000 | 85% 136,000 | 80% 148,000 |
| High molecular weight polymer[2] | 10% 800,000 | 15% 800,000 | 20% 800,000 |
| Mw | 206,000 | 230,000 | 242,000 |
| Mz | 563,000 | 612,000 | 640,000 |
| Mw/Mn | 2.56 | 2.95 | 2.73 |
| Properties |  |  |  |
| MFR (g/10 min.)[3] | 10.41 | 7.54 | 6.21 |
| VHD (°C.)[4] | 107 | 107 | 107 |
| Tr (psi)[5] | 5,397 | 6,003 | 6,171 |
| % Elongation[6] | 1.28 | 1.42 | 1.44 |
| Flex Strength (psi)[7] | 6,548 | 7,483 | 7,805 |
| Rheometrics[8] |  |  |  |
| Yield Force (lb.)[9] | 44.8 | 50.3 | 54.7 |
| Yield Energy | 0.69 | 0.78 | 0.94 |

TABLE VI-continued

| | Sample Composition No. | | |
|---|---|---|---|
| | 6 | 12 | 13 |
| (in. lb.)[10] | | | |

Footnotes:
[1]Percent by weight of intermediate molecular weight polymer in the final sample composition and weight average molecular weight of such polymer.
[2]Percent by weight and weight average molecular weight of high molecular weight polymers in the final sample composition.
[3]Melt Flow Rate in grams per 10 minutes.
[4]Vicat Heat Distortion in °C.
[5]Tensile strength at rupture in pounds per square inch.
[6]Percent elongation.
[7]Flex strength in pounds per square inch.
[8]Instrumented impact testing done on a Rheometrics, Inc. test unit at 1,000 inches per minute ram speed on 2 inch injection molded disc samples on a 1½ inch support ring.
[9]Force in pounds required to break a sample molded from the resin.
[10]Energy in inch pounds required to break a sample molded from the resin.
*Indicates quantity not determined.

The above sample compositions illustrate compositions according to the present teachings containing up to about 20 weight percent high molecular weight polymer.

COMMERCIAL RESIN PROPERTIES

In Table VII below, characteristic physical properties of several commercially available polystyrene resins are given. These resins are tested in the same manner as described above for the other sample compositions. The resins are of the type known as medium and easy-flow resins. In the case of the first commercial resin, two samples of the commercial resin are obtained and tested and slightly different results obtained. These results are shown by designating one sample as "1" and the other sample as "1a". The difference in sample properties is due in part to the samples coming from different production plants and in part to the inherent variations experienced in commercial scale polymer resin production. In general, however, the commercial resins tested exhibited consistent, expected trends in spite of the slight variations.

TABLE VII

| Commercial Resins Easy and Medium Flow | | | |
|---|---|---|---|
| | Commercial Resin No. | | |
| | 1[10] | 1a[10] | 2[11] |
| Composition | | | |
| Mw | 201,000 | 205,000 | 229,000 |
| Mz | 411,000 | 376,000 | 484,000 |
| Mw/Mn | 2.58 | 2.15 | 2.78 |
| Mineral Oil[1] (wt. %) | 0 | 0 | 1.0% |
| Properties | | | |
| MFR (g/10 min)[2] | 8.28 | 6.59 | 8.54 |
| VHD (°C.)[3] | 107 | 105 | 101 |
| Tr (psi)[4] | 5,620 | 6,475 | 5,986 |
| % Elongation[5] | 1.34 | 1.52 | 1.43 |
| Flex Strength (psi[6]) | 6,740 | 9,424 | 8,003 |
| Rheometrics Test[7] | | | |
| Force (lb)[8] | 40.7 | 46.4 | 48.1 |
| Energy (in. lb)[9] | 0.61 | 0.69 | 0.71 |

Footnotes:
[1]Percent by weight mineral oil in the resin.
[2]Melt Flow Rate in grams per 10 minutes.
[3]Vicat Heat Distortion in °C.
[4]Tensile strength at rupture in pounds per square inch.
[5]Percent elongation.
[6]Flex strength in pounds per square inch.
[7]Instrumented impact testing done on a Rheometrics Inc. test unit at 1,000 inches per minute ram speed on 2 inch injection molded disc samples on a 1½ inch support ring.
[8]Force in pounds required to break a sample molded from the resin.
[9]Energy in inch pounds required to break a sample molded from the resin.
[10]Styron 680 ® Brand polystyrene resin manufactured by The Dow Chemical Company.
[11]Styron 666 ® Brand polystyrene resin manufactured by The Dow Chemical Company.

FIG. 4 shows a plotting of the relationships between the melt flow rates (MFR's) of various nonplastified medium-flow resins against the amount of force required to break samples molded from the resins as measured by a Rheometric testing unit. The resins are identified in Tables I, III, IV, V, VI and VII above by the corresponding numbers in those tables. As can be seen in FIG. 4, in the case of the Control Samples which are Commercial Resins CR-1 and CR-1a and Comparative Examples C-1, C-2, C-3 and C-4, which Control Samples are all isothermal polystyrenes of differing Mw's, a plot of this relationship yields a fairly straight line, illustrating the direct relationship between the MFR and strength of polystyrene resins. In the case of sample compositions according to the present invention, however, plotting yield energy against MFR produces a series of points which generally have substantially improved combinations of MFR and strength over the isothermal resins.

In Table IX below, several of the example compositions described above and a commercial resin are injection molded on a Husky injection molding machine into plastic cups or tumblers. When the maximum rate at which good quality tumblers are produced is achieved, the injection pressure required to fill the mold and average time required to mold a cup are observed. Afterward the cup strength is tested as described above. In these tests the barrel temperature profile is from 210° C. to 265° C.

Table IX also summarizes the physical properties of the resins to illustrate the overall advantages of the present invention.

TABLE IX

| | Injection Molding Data | | | |
|---|---|---|---|---|
| Resin Properties | Sample Composition No. | | | Commercial Resin No. |
| | 4 | 7 | 9 | 25 |
| VHD (°C.) | 107 | 108 | 108 | 101 |
| MFR (g/10 min) | 7.40 | 9.21 | 7.33 | 8.54 |
| Yield Energy (in. lb.) | 0.61 | * | 0.87 | 0.71 |
| Tr (psi) | 6,272 | 5,745 | 6,272 | 5,986 |
| Molding Data | | | | |
| Injection Pressure (psi)[1] | 600 | 550 | 575 | 540 |
| Cycle Time (sec)[2] | 4.0 | 3.9 | 3.9 | 4.3 |
| Tumbler Properties | | | | |
| Tumbler Strength Force to | 5.0 | 4.20 | 4.67 | 4.50 |

TABLE IX-continued

| | Injection Molding Data | | | |
|---|---|---|---|---|
| Resin | Sample Composition No. | | | Commercial Resin No. |
| Properties | 4 | 7 | 9 | 25 |
| Rupture (lb)[3] % Flex to Rupture[4] | 22.0 | 22.7 | 24.0 | 19.7 |

[1]Pressure in pounds per square inch required to fill the mold with molten resin.
[2]Average time in seconds required to mold a cup, once the apparatus was adjusted to produce good quality cups as fast as possible.
[3]Force in pounds required to break a cup as measured by an Instron test unit.
[4]Percent the cup flexes before breaking as force is applied across the cup lip.
[5]Styron 666 = brand polystyrene resin, manufactured by The Dow Chemical Company.

Table IX above illustrates the practical advantage of resins prepared according to the present teachings over commercially available resins. In addition to having better heat resistance as shown by Vicat Heat Distortion temperatures and similar melt flow rates, the resins prepared according to the present teachings can be molded into cups faster than the commercial resins, as shown by the reduced cycle times. The molded cups, in general, are as strong or stronger as shown by the tumbler strength data.

While the present invention has been described with reference to particular embodiments and examples, it should be understood that such embodiments are not intended to limit the scope of the instantly claimed invention.

What is claimed is:

1. A monovinylidene aromatic polymer composition comprising:
    (a) from about 65 to about 98 parts by weight of intermediate molecular weight monovinylidene aromatic polymer having a weight average molecular weight (Mw) of from about 5.2 to 12.6 times the entanglement molecular weight and a weight average molecular weight to number average molecular weight (Mn) ratio (Mw/Mn) of from about 1 to about 3;
    (b) from about 2 to about 35 parts by weight of high molecular weight monovinylidene aromatic polymer having a weight average molecular weight of from about 26.2 to 99.5 times the entanglement molecular weight and a Mw/Mn of from about 1 to about 3; in which composition the molecular weight of polymers having a Mw of up to 700,000 is determined by gel permeation chromatography and the molecular weight of polymers having a Mw of greater than 700,000 is determined by solution viscosity; and
    (c) less than about 0.5 percent by weight based on the combined weight of (a) and (b) of a plasticizer.

2. A composition according to claim 1 comprising:
    (a) from about 75 to about 93 parts by weight of intermediate molecular weight polymer having a weight average molecular weight (Mw) of from about 6.3 to 9.4 times the entanglement molecular weight and a weight average molecular weight to number average molecular weight (Mn) ratio (Mw/Mn) of from about 1.5 to about 2.5; and
    (b) from about 7 to about 25 parts by weight of high molecular weight polymer having a weight average molecular weight of from about 31.4 to 52.4 times the entanglement molecular weight and a Mw/Mn of from about 1.5 to about 2.5.

3. A composition according to claim 1 wherein the amount of high molecular weight polymer included is further characterized by having the amount of such polymer included in the composition in terms of parts by weight being dependent on the entanglement molecular weight multiple (E) of the high molecular weight polymer, said number of parts by weight being at least about the number given by the formula:

$$(-0.038)E + 5.8$$

and not greater than about the number given by the formula:

$$(-0.382)E + 43.$$

4. A composition according to claim 3 wherein the weight average molecular weight of the high molecular weight polymer is from about 31.4 to 52.4 times the entanglement molecular weight and the number of parts by weight of the high molecular weight polymer is at least the number given by the formula:

$$(-0.038)E + 8.7$$

and not greater than the number given by the formula:

$$(-0.287)E + 34.$$

5. A composition according to claim 1 having better impact resistance than an isothermal polymer of the same type having an equivalent melt flow rate and the same levels of plasticizing additives.

6. A composition according to claim 1 comprising at least about 50 percent by weight monovinylidene aromatic monomer polymerized therein.

7. A composition according to claim 1 comprising at least about 50 percent by weight styrene polymerized therein.

8. A composition according to claim 1 comprising at least about 90 percent by weight monovinylidene aromatic monomer polymerized therein.

9. A composition according to claim 1 comprising at least about 90 percent by weight styrene polymerized therein.

10. A polystyrene resin composition according to claim 1 comprising:
    (a) from about 65 to about 98 parts by weight of intermediate molecular weight polystyrene having a weight average molecular weight (Mw) of from about 100,000 to about 240,000 and a weight average molecular weight to number average molecular weight (Mn) ratio (Mn/Mn) of from about 1 to about 3; and
    (b) from about 2 to about 35 parts by weight of high molecular weight polystyrene having a weight average molecular weight of from about 500,000 to about 1,900,000 and a Mw/Mn of from about 1 to about 3.

11. A composition according to claim 10 comprising:
    (a) from about 75 to about 93 parts by weight of intermediate molecular weight polymer having a weight average molecular weight (Mw) of from about 120,000 to about 180,000 and a weight average molecular weight to number average molecular weight (Mn) ratio (Mw/Mn) of from about 1.5 to about 2.5; and
    (b) from about 7 to about 25 parts by weight of high molecular weight polymer having a weight average molecular weight of from about 600,000 to about 1,000,000 and a Mw/Mn of from about 1.5 to about 2.5.

12. A composition according to claim 10 wherein the amount of high molecular weight polymer included is further characterized by having the amount of such polymer included in the composition in terms of parts by weight being dependent on the weight average molecular weight of the high molecular weight polymer, said number of parts by weight being at least about the number given by the formula:

$$(-2.0 \times 10^{-6})Mw + 5.8$$

and not greater than about the number given by the formula:

$$(-2.0 \times 10^{-5})Mw + 43,$$

wherein Mw is the weight average molecular weight of the high molecular weight polymer.

13. A composition according to claim 10 wherein the weight average molecular weight of the high molecular weight polymer is from about 600,000 to about 1,000,000 and the number of parts by weight of the high molecular weight polymer is at least the number given by the formula:

$$(-2.0 \times 10^{-6})Mw + 8.7$$

and not greater than the number given by the formula:

$$(-1.5 \times 10^{-5})Mw + 34,$$

wherein Mw is the weight average molecular weight of the high molecular weight polymer.

14. A composition according to claim 10 having a better impact resistance than an isothermal polystyrene having an equivalent melt flow rate and the same levels of plasticizing additives.

15. A composition according to claim 12 having a better impact resistance than an isothermal polystyrene having an equivalent melt flow rate and the same levels of plasticizing additives.

16. A composition according to claim 13 having a better impact resistance than an isothermal polystyrene having an equivalent melt flow rate and the same levels of plasticizing additives.

17. A composition according to claim 1 wherein (b) is about 10 parts by weight of a monovinylidene aromatic polymer having a weight average molecular weight of about 41.9 times the entanglement molecular weight.

18. A composition according to claim 15 wherein (b) is about 10 parts by weight polystyrene having a weight average molecular weight of about 800,000.

19. A composition according to claim 1 wherein the plasticizer is present in an amount less than about 0.1 percent by weight based on the combined weight of (a) and (b).

20. A composition according to claim 19 that is substantially devoid of plasticizer.

21. A composition according to claim 1 consisting essentially of components (a) and (b).

* * * * *